May 31, 1927.

E. J. MURPHY

VALVE CAP

Filed Dec. 14, 1925

1,631,050

INVENTOR
EDWARD J. MURPHY

BY
ATTORNEY

Patented May 31, 1927.

1,631,050

UNITED STATES PATENT OFFICE.

EDWARD JAMES MURPHY, OF FRAMINGHAM, MASSACHUSETTS.

VALVE CAP.

Application filed December 14, 1925. Serial No. 75,368.

The invention has for its object to provide a simple new and improved valve cap adaptable for use as a substitute for the valve caps now commonly used on pneumatic tires and which is so constructed and mounted that it is forced into contact with the end of the valve stem passage by engagement therewith of the dust cap commonly used, the engagement being such that all possibility of air leakage is overcome, and the usual valve plunger is held inwardly of the stem end to hold the valve parts separated against wear by pressure contact.

The invention further has for its object to provide a valve cap which when so held against the valve stem end it will not only effectively close the same against leakage but will also normally hold the ordinarily projected valve plunger inwardly of its spring projected position to effect a normal separation of the valve plunger proper from its seat thereby preventing wear.

With the above and other objects in view that will hereinafter appear, the invention still further resides in the novel details of construction, combination and arrangement of parts, all of which will be first fully described in the following detailed description, then be particularly pointed out in the appended claims, reference being had to the accompanying drawing, in which:

Figure 1:
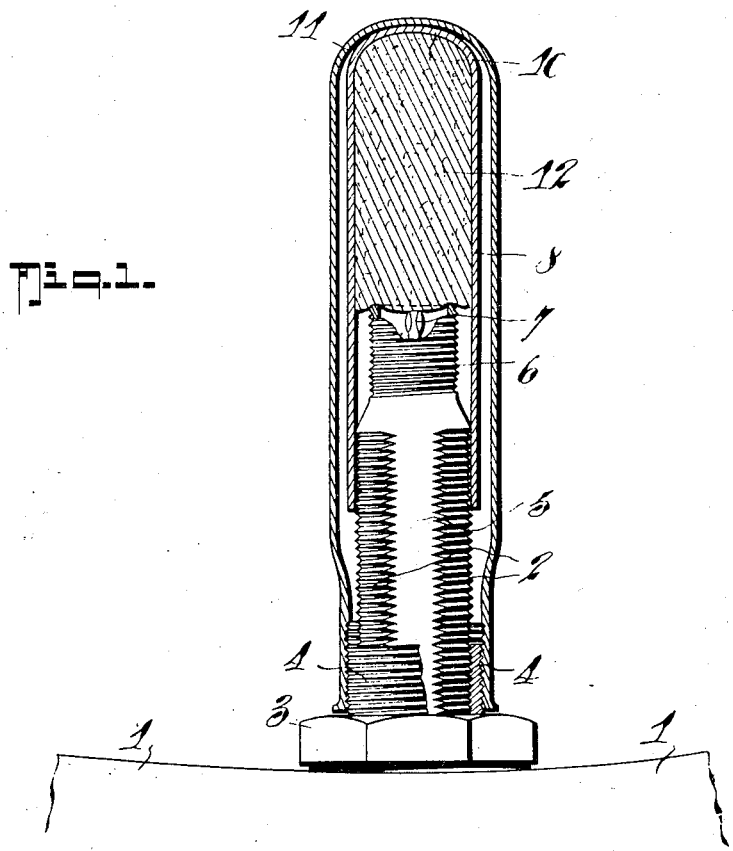
Figure 1 is a central vertical section illustrating my invention as applied to the conventional type of tire valve.
Figure 2:
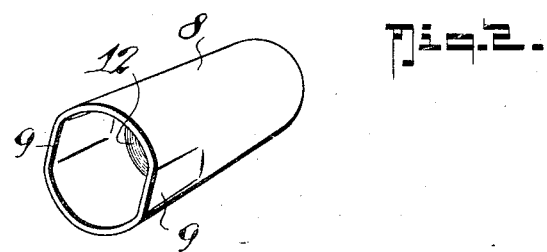
Figure 2 is a detail perspective view of my valve cap.

In the drawing in which like numerals of reference indicate like parts in all the figures, 1 indicates a portion of a wheel felly and 2 the usual externally threaded valve stem of a pneumatic tire which projects therethrough and is secured to position by the usual lock nut 3 which also includes the usual externally threaded sleeve 4 upon which the usual dust cap is adapted to be threaded.

The main valve stem body 2 has two sides thereof flattened as at 5 in the usual manner and includes the reduced externally threaded portion 6 adapted to receive the usual valve cap and in which is mounted the usual valve structure or plunger, the projected portion of which is indicated at 7.

The parts thus far described are all of conventional form and their construction and use are well known.

My improved valve cap is indicated at 8 and the same is in the nature of a hollow cylindrical body having one end thereof closed and the other end thereof open and adapted to snugly fit over the end of the valve stem, the sides of the open end of the said cap being flattened as at 9 to snugly engage the flat sides of the said stem to prevent rotation of the said cap.

The closed end of the cap 8 is preferably shaped to provide a rounded head 10 adapted to be engaged by the dust cap 11 when the same is threaded onto the sleeve 4 of the lock nut 3, and in the said closed end of the cap 8 is inserted a soft rubber gasket 12 adapted, when the said cap is placed in position upon the valve stem, to close over the discharge end of the said stem.

As hereinbefore stated my improved valve cap 8 is adapted to be used as a substitute for the common type of valve cap now in use when the same is inserted over the end of the valve stem and the dust cap 11 inserted thereover and screwed home upon the threaded sleeve 4, the upper end of the said dust cap will engage the rounded head 10 of the valve cap and force the gasket 12 into tight engagement with the discharge end of the valve stem in a manner effecting an air tight closure preventing all possibility of air leakage.

In the use of the present type of valve caps it is a common occurrence to have the said caps become loosened due to vibration when, if the valve within the stem 2 is at all leaky, and all of them become so in time, air is permitted to slowly leak out of the tire and the same permitted to become deflated.

By the use of my improved valve cap, by merely mounting the same upon the end of the valve stem and tightening it down by screwing home the dust cap 11 all possibility of air escape is overcome and the said valve cap cannot be jarred loose by rotation thereof in view of the engagement of the flattened sides thereof with those of the valve stem.

Also, in view of the fact that all valves sooner or later become leaky it is a purpose of my invention to normally hold the parts of the valve out of operation, to eliminate otherwise normal wear. In other words it is my purpose to normally hold the valve off of its seat against its spring held tendency so that the valve and its seat, usually rubbergasketed, will not become inefficient by wear due to constant pressure of the spring. This is accomplished by the use of the soft rubber gasket 12 in the manner illustrated in Figure 1 of the drawing from which it will be observed that when the parts are screwed home to the desired air escape closed position, the central portion of the said gasket will be forced tightly into contact with the projected valve plunger end and will force the same inwardly to release the valve from its seat and to hold the same to that position so long as the valve cap is held in place.

In this manner the ordinary valve of the tire is not normally used and the valve and valve seat thereof are not therefor subjected to wear. However, should, by carelessness of the user failing to properly screw home the dust cap 11 upon the valve cap 8, the said valve cap not be brought into perfect function, the ordinary valve could then function in its usual manner preventing air escape until the proper positioning of my improved valve cap has been effected at a later time.

From the foregoing description, taken in connection with the accompanying drawing, it is thought that the novel details of construction, the manner of use, and the advantages of my invention will be readily apparent to those skilled in the art to which it relates.

What I claim is:

1. In a device of the class described, the combination with a tire valve stem, lock nut, and dust cap, of a valve cap adapted to be applied over the end of the valve stem and of a length for extending vertically into position for being engaged by the said dust cap as it is screwed home and having a gasket to engage said stem end whereby when the dust cap is screwed home upon the lock nut the gasket will be compressed against the said stem end.

2. In a device of the class described, the combination with a tire valve stem having flat sides, lock nut, and dust cap, of a valve cap adapted to be applied over the end of the valve stem and of a length for extending vertically into position for being engaged by the said dust cap as it is screwed home and having a gasket to engage said stem end whereby when the dust cap is screwed home upon the lock nut the gasket will be compressed against the said stem end, said valve cap having flattened portions for engaging the flat sides of the valve stem to prevent rotation of said cap.

3. In a device of the class described, the combination with a tire valve stem, lock nut, valve and dust cap, of a valve cap adapted to be applied over the end of the valve stem and of a length for extending vertically into position for being engaged by the said dust cap as it is screwed home and having a gasket to engage said stem end whereby when the dust cap is screwed home upon the lock nut the gasket will be compressed against the said stem end, said gasket being so shaped and positioned that when compressed against the stem end a portion thereof will engage the plunger of the valve to hold the same normally away from its seat to prevent wear by constant pressure.

4. In a device of the class described, the combination with a tire valve stem having flat sides, lock nut, valve and dust cap, of a valve cap adapted to be applied over the end of the valve stem and of a length for extending vertically into position for being engaged by the said dust cap as it is screwed home and having a gasket to engage said stem end whereby when the dust cap is screwed home upon the lock nut the gasket will be compressed against the said stem end, said valve cap having flattened portions for engaging the flat sides of the valve stem to prevent rotation of said cap, said gasket being so shaped and positioned that when compressed against the stem end a portion thereof will engage the plunger of the valve to hold the same normally away from its seat to prevent wear by constant pressure.

EDWARD JAMES MURPHY.